(12) United States Patent
Brunswig et al.

(10) Patent No.: US 11,354,332 B2
(45) Date of Patent: Jun. 7, 2022

(54) ENABLING DATA ACCESS BY EXTERNAL CLOUD-BASED ANALYTICS SYSTEM

(71) Applicant: SAP SE, Walldorf (DE)

(72) Inventors: Frank Brunswig, Heidelberg (DE); Andreas Balzar, Heidelberg (DE); Selcuk Imal, Ludwigshafen (DE); Christian Muenkel, Schriesheim (DE); Stefan Unnebrink, Neckargemuend (DE); Marco Pesarese, Nussloch (DE); Atul Rajendra Prasad Tiwari, Hockenheim (DE); Peter Weddeling, Sinsheim (DE)

(73) Assignee: SAP SE, Walldorf (DE)

( * ) Notice: Subject to any disclaimer, the term of this patent is extended or adjusted under 35 U.S.C. 154(b) by 21 days.

(21) Appl. No.: 16/878,742

(22) Filed: May 20, 2020

(65) Prior Publication Data

US 2021/0365469 A1 Nov. 25, 2021

(51) Int. Cl.
*G06F 16/25* (2019.01)
*G06F 16/21* (2019.01)
*G06F 16/23* (2019.01)
*G06F 16/248* (2019.01)

(52) U.S. Cl.
CPC ......... *G06F 16/258* (2019.01); *G06F 16/211* (2019.01); *G06F 16/2358* (2019.01); *G06F 16/248* (2019.01)

(58) Field of Classification Search
CPC .. G06F 16/258; G06F 16/211; G06F 16/2358; G06F 16/248

USPC ....................................................... 707/769
See application file for complete search history.

(56) References Cited

U.S. PATENT DOCUMENTS

| | | | |
|---|---|---|---|
| 7,263,520 B2 | 8/2007 | Biedenstein et al. |
| 7,315,853 B2 | 1/2008 | Brunswig et al. |
| 7,350,033 B2 | 3/2008 | Hofmann et al. |
| 7,424,685 B2 | 9/2008 | Behrens et al. |
| 7,426,523 B2 | 9/2008 | Schroeder et al. |
| 7,428,552 B2 | 9/2008 | Muenkel |
| 7,454,660 B1 | 11/2008 | Kolb et al. |
| 7,480,920 B2 | 1/2009 | Brendle et al. |
| 7,487,512 B2 | 2/2009 | Brunswig et al. |
| 7,509,301 B2 | 3/2009 | Schmitt et al. |

(Continued)

OTHER PUBLICATIONS

U.S. Appl. No. 10/744,245, filed Dec. 23, 2003, Brendle et al.

(Continued)

*Primary Examiner* — Dung K Chau (74) *Attorney, Agent, or Firm* — Fish & Richardson P.C.

(57) ABSTRACT

Methods, systems, and computer-readable storage media for retrieving metadata associated with data stored within a database system of an enterprise, the metadata being provided in a first format and being used by the first system to store and access the data, providing a document including the metadata provided in an interoperable format, processing, by a deployer, the document to provide analytics engine metadata in a second format, the analytics metadata being stored in the second system and being consumable by the DB-based analytics engine to access the data from the database system of the enterprise, and retrieving, by the DB-based analytics engine, the data from the database system of the enterprise based on the analytics metadata to provide analytics data based on the data.

20 Claims, 8 Drawing Sheets

(56) References Cited

U.S. PATENT DOCUMENTS

| | | |
|---|---|---|
| 7,533,103 B2 | 5/2009 | Brendle et al. |
| 7,536,673 B2 | 5/2009 | Brendle et al. |
| 7,620,642 B2 | 11/2009 | Zurek et al. |
| 7,673,245 B2 | 3/2010 | Weddeling et al. |
| 7,676,816 B2 | 3/2010 | Brunswig et al. |
| 7,685,114 B2 | 3/2010 | Brunswig et al. |
| 7,685,268 B2 | 3/2010 | Brunswig et al. |
| 7,685,568 B2 | 3/2010 | Brendle et al. |
| 7,685,644 B2 | 3/2010 | John et al. |
| 7,698,174 B2 | 4/2010 | Brunswig et al. |
| 7,702,650 B2 | 4/2010 | Brunswig et al. |
| 7,707,052 B2 | 4/2010 | Kuhn et al. |
| 7,720,803 B2 | 5/2010 | Unnebrink et al. |
| 7,725,907 B2 | 5/2010 | Bloching et al. |
| 7,765,494 B2 | 7/2010 | Brunswig et al. |
| 7,769,821 B2 | 8/2010 | Brunswig et al. |
| 7,770,146 B2 | 8/2010 | Brunswig et al. |
| 7,774,463 B2 | 8/2010 | Bloching et al. |
| 7,778,965 B2 | 8/2010 | Bindewald et al. |
| 7,797,370 B2 | 9/2010 | Brunswig et al. |
| 7,801,996 B2 | 9/2010 | Brunswig et al. |
| 7,810,102 B2 | 10/2010 | Brendle et al. |
| 7,818,342 B2* | 10/2010 | Stuhec ............... G06F 16/258 707/777 |
| 7,840,944 B2 | 11/2010 | Brunswig et al. |
| 7,844,615 B2 | 11/2010 | Brunswig et al. |
| 7,877,695 B2 | 1/2011 | Brunswig et al. |
| 7,890,959 B2 | 2/2011 | Brunswig et al. |
| 7,900,190 B2 | 3/2011 | Brunswig et al. |
| 7,908,248 B2 | 3/2011 | Brunswig et al. |
| 7,917,524 B2 | 3/2011 | Brunswig et al. |
| 7,930,251 B2 | 4/2011 | Bloching et al. |
| 7,966,603 B2 | 6/2011 | Brunswig et al. |
| 7,984,020 B2 | 7/2011 | Brunswig et al. |
| 8,015,039 B2 | 9/2011 | Brunswig et al. |
| 8,015,262 B2 | 9/2011 | Brunswig et al. |
| 8,032,890 B2 | 10/2011 | Brendle et al. |
| 8,056,091 B2 | 11/2011 | Brunswig et al. |
| 8,060,863 B2 | 11/2011 | Brunswig et al. |
| 8,074,228 B2 | 12/2011 | Aakolk et al. |
| 8,074,229 B2 | 12/2011 | Brunswig et al. |
| 8,108,433 B2 | 1/2012 | Brunswig et al. |
| 8,122,062 B2 | 2/2012 | Brendle et al. |
| 8,122,374 B2 | 2/2012 | Brunswig et al. |
| 8,132,119 B2 | 3/2012 | Brunswig et al. |
| 8,135,689 B2 | 3/2012 | Said et al. |
| 8,180,845 B2 | 5/2012 | Brendle et al. |
| 8,234,308 B2 | 7/2012 | Brendle et al. |
| 8,370,400 B2 | 2/2013 | Brunswig et al. |
| 8,386,555 B2 | 2/2013 | Brunswig et al. |
| 8,387,030 B2 | 2/2013 | Brunswig et al. |
| 8,392,227 B2 | 3/2013 | Brunswig et al. |
| 8,479,111 B2 | 7/2013 | Brunswig |
| 8,533,413 B2 | 9/2013 | Brunswig et al. |
| 8,555,248 B2 | 10/2013 | Brunswig et al. |
| 8,612,927 B2 | 12/2013 | Brunswig et al. |
| 8,645,913 B2 | 2/2014 | Brunswig et al. |
| 8,655,923 B2 | 2/2014 | Zurek et al. |
| 8,661,432 B2 | 2/2014 | Kriebel et al. |
| 8,726,229 B2 | 5/2014 | Brunswig et al. |
| 8,739,166 B2 | 5/2014 | Nos et al. |
| 8,745,690 B2 | 6/2014 | Brunswig et al. |
| 8,756,567 B2 | 6/2014 | Jentsch et al. |
| 8,788,533 B2 | 7/2014 | Brunswig et al. |
| 8,806,422 B2 | 8/2014 | Brunswig et al. |
| 8,832,658 B2 | 9/2014 | Jentsch et al. |
| 8,838,627 B2 | 9/2014 | Brunswig et al. |
| 8,843,436 B2 | 9/2014 | Marchall et al. |
| 8,863,075 B2 | 10/2014 | Said et al. |
| 8,892,667 B2 | 11/2014 | Brunswig et al. |
| 8,949,678 B2 | 2/2015 | Brunswig et al. |
| 8,955,080 B2 | 2/2015 | Brunswig et al. |
| 9,009,110 B2 | 4/2015 | Brunswig et al. |
| 9,020,881 B2 | 4/2015 | Ritter et al. |
| 9,053,445 B2 | 6/2015 | Brunswig et al. |
| 9,058,176 B2 | 6/2015 | Jentsch et al. |
| 9,098,559 B2 | 8/2015 | Muenkel |
| 9,135,319 B2 | 9/2015 | Ritter et al. |
| 9,170,826 B2 | 10/2015 | Brunswig et al. |
| 9,171,039 B2 | 10/2015 | Teichmann et al. |
| 9,280,676 B2 | 3/2016 | Said et al. |
| 9,330,080 B2 | 5/2016 | Muenkel |
| 9,400,830 B2 | 7/2016 | Dipper et al. |
| 9,406,044 B2 | 8/2016 | Brunswig et al. |
| 9,423,920 B2 | 8/2016 | Brunswig et al. |
| 9,460,415 B2 | 10/2016 | Brunswig et al. |
| 9,489,179 B2 | 11/2016 | Pesarese |
| 9,536,222 B2 | 1/2017 | Brunswig et al. |
| 9,547,505 B2 | 1/2017 | Brunswig et al. |
| 9,697,104 B2 | 7/2017 | Obermiller et al. |
| 9,703,833 B2 | 7/2017 | Buchmann et al. |
| 9,749,453 B2 | 8/2017 | Said et al. |
| 9,886,249 B2 | 2/2018 | Pesarese et al. |
| 10,055,113 B2 | 8/2018 | Brunswig et al. |
| 10,055,269 B2 | 8/2018 | Geiger et al. |
| 10,091,282 B2 | 10/2018 | Said et al. |
| 10,095,733 B2 | 10/2018 | Brunswig et al. |
| 10,157,068 B2 | 12/2018 | Arians et al. |
| 10,282,360 B2 | 5/2019 | Krause et al. |
| 10,423,917 B2 | 9/2019 | Said et al. |
| 10,503,821 B2 | 12/2019 | Brunswig et al. |
| 10,929,415 B1* | 2/2021 | Shcherbakov ......... G06F 16/26 |
| 10,936,585 B1* | 3/2021 | Echeverria ........... G06F 16/156 |
| 2005/0021543 A1 | 1/2005 | Schmitt et al. |
| 2005/0065983 A1 | 3/2005 | Wang et al. |
| 2005/0091276 A1 | 4/2005 | Brunswig et al. |
| 2005/0138113 A1 | 6/2005 | Brendle et al. |
| 2005/0192941 A1 | 9/2005 | Biedenstein et al. |
| 2005/0192942 A1 | 9/2005 | Biedenstein et al. |
| 2005/0203951 A1* | 9/2005 | Schroeder ............... G06F 9/465 |
| 2005/0257066 A1 | 11/2005 | John et al. |
| 2006/0010161 A1* | 1/2006 | Muenkel .................. G06F 8/20 |
| 2006/0143225 A1 | 6/2006 | Brendle et al. |
| 2007/0006041 A1 | 1/2007 | Brunswig et al. |
| 2008/0306753 A1 | 12/2008 | Brunswig et al. |
| 2009/0019424 A1 | 1/2009 | Klein et al. |
| 2009/0172003 A1 | 7/2009 | Jentsch et al. |
| 2010/0001834 A1 | 1/2010 | Brunswig et al. |
| 2010/0088391 A1 | 4/2010 | Brunswig et al. |
| 2010/0162147 A1 | 6/2010 | Ritter et al. |
| 2012/0167056 A1 | 6/2012 | Brunswig et al. |
| 2013/0086547 A1 | 4/2013 | Said et al. |
| 2013/0145371 A1 | 6/2013 | Brunswig et al. |
| 2013/0166602 A1 | 6/2013 | Brunswig et al. |
| 2013/0166603 A1 | 6/2013 | Said et al. |
| 2013/0166675 A1 | 6/2013 | Giebel et al. |
| 2013/0174181 A1 | 7/2013 | Jentsch et al. |
| 2014/0006000 A1 | 1/2014 | Said et al. |
| 2014/0039968 A1 | 2/2014 | Said et al. |
| 2014/0068021 A1 | 3/2014 | Arseniev et al. |
| 2014/0136668 A1 | 5/2014 | Brunswig et al. |
| 2014/0181004 A1 | 6/2014 | Said et al. |
| 2014/0195908 A1 | 7/2014 | Brunswig et al. |
| 2014/0279839 A1 | 9/2014 | Balzar et al. |
| 2014/0366002 A1 | 12/2014 | Jentsch et al. |
| 2015/0100946 A1 | 4/2015 | Brunswig et al. |
| 2015/0113093 A1 | 4/2015 | Brunswig et al. |
| 2015/0169675 A1 | 6/2015 | Said et al. |
| 2015/0379059 A1 | 12/2015 | Schroetel et al. |
| 2016/0162263 A1 | 6/2016 | Brunswig |
| 2017/0109421 A1* | 4/2017 | Steam .................. G06F 16/951 |
| 2017/0139577 A1 | 5/2017 | Pesarese |
| 2017/0329505 A1 | 11/2017 | Richter et al. |
| 2017/0331915 A1 | 11/2017 | Jann et al. |
| 2018/0329963 A1 | 11/2018 | Voutta et al. |
| 2019/0340285 A1 | 11/2019 | Said et al. |
| 2019/0340286 A1 | 11/2019 | Said et al. |
| 2019/0340289 A1 | 11/2019 | Said et al. |
| 2019/0370014 A1 | 12/2019 | Pesarese |
| 2019/0385102 A1 | 12/2019 | Said et al. |

(56) References Cited

U.S. PATENT DOCUMENTS

2020/0133945 A1* 4/2020 Friedt .................. G06F 16/2425
2021/0281659 A1* 9/2021 Syckel .................. G06F 16/242

OTHER PUBLICATIONS

U.S. Appl. No. 10/745,459, filed Dec. 23, 2003, Brendle et al.
U.S. Appl. No. 10/747,018, filed Dec. 23, 2003, Brendle et al.
U.S. Appl. No. 10/747,020, filed Dec. 23, 2003, Brendle et al.
U.S. Appl. No. 10/747,033, filed Dec. 23, 2003, Brendle et al.
U.S. Appl. No. 10/819,715, filed Apr. 6, 2004, Kuhn et al.
U.S. Appl. No. 10/954,904, filed Sep. 30, 2004, Brunswig et al.
U.S. Appl. No. 10/963,337, filed Oct. 11, 2004, Brunswig et al.
U.S. Appl. No. 10/963,487, filed Oct. 12, 2004, Brunswig et al.
U.S. Appl. No. 11/302,855, filed Dec. 13, 2005, Zurek et al.
U.S. Appl. No. 11/392,327, filed Mar. 28, 2006, Unnebrink et al.
U.S. Appl. No. 16/368,448, filed Mar. 28, 2019, Qiao et al.
Extended European Search Report issued in European Application No. 21158855.3 dated Jul. 21, 2021, 8 pages.
Blogs.sap.com [online], "Consuming SAP HANA data into SAP Analytics Cloud through live connection—End to End scenario" Feb. 2020, [retrieved on Jul. 12, 2021], retrieved from : URL <https://blogs.sap.com/2020/02/05/consuming-sap-hana-data-into-sap-analytics-cloudthrough-live-connection-end-to-end-scenario/>, 26 pages.
Blogs.sap.com [online], "SAP Analytics Cloud: Live Smart Predict with SAP HAN" Dec. 2019 [retrieved on Jul. 12, 2021], retrieved from : URL <https://blogs.sap.com/2019/12/03/sap-analytics-cloud-live-smart-predict-with-sap-hana/>, 27 pages.

* cited by examiner

ENABLING DATA ACCESS BY EXTERNAL CLOUD-BASED ANALYTICS SYSTEM

BACKGROUND

An enterprise can use multiple systems for storing and processing data. For example, an enterprise can use a system that stores data in a database system and provides metadata that defines how the data is stored and how the data is accessed. Analytics systems have been introduced that provide advanced analytics capabilities and improved data processing performance as compared to that provided by other systems, such as a system within which the enterprise stores and maintains its data. Such analytics systems can include cloud-based analytics systems that include an analytics engine that is executed directly within the underlying database system. Such an analytics engine can be referred to as a database (DB) analytics engine (DB-based analytics engine).

To provide a unified user experience for enterprises, it is desirable to connect systems within which data of the enterprise is stored to the DB-based analytics engine. In this manner, an enterprise is able to leverage the more sophisticated and resource-efficient analytics provided by an analytics system through the DB-based analytics engine. Traditional techniques to achieve this include, for example, providing a so-called live connection using an online analytical processing (OLAP) processor, and through the DB-based analytics engine using so-called calculation views. However, such traditional techniques have disadvantages. For example, calculation views used in the database system access causes severe performance issues, because of the complexity and missing metadata, as well as other disadvantages.

SUMMARY

Implementations of the present disclosure are directed to enabling data provided in a first system to be accessed and processed by an analytics engine of a second system. More particularly, implementations of the present disclosure transform metadata (that is used by the first system to store and access data) from a first format to a second format through an intermediate format to enable the analytics engine of the second system to access the data for analytics processing.

In some implementations, actions include retrieving metadata associated with data stored within a database system of an enterprise, the metadata being provided in a first format and being used by the first system to store and access the data, providing a document including the metadata provided in an interoperable format, processing, by a deployer, the document to provide analytics engine metadata in a second format, the analytics metadata being stored in the second system and being consumable by the DB-based analytics engine to access the data from the database system of the enterprise, and retrieving, by the DB-based analytics engine, the data from the database system of the enterprise based on the analytics metadata to provide analytics data based on the data. Other implementations of this aspect include corresponding systems, apparatus, and computer programs, configured to perform the actions of the methods, encoded on computer storage devices.

These and other implementations can each optionally include one or more of the following features: the metadata is retrieved in response to the data being marked as to be accessible to the DB-based analytics engine; the metadata is retrieved in response to determining that a change to the metadata has occurred; the DB-based analytics engine is executed within the database system of the enterprise; the DB-based analytics engine is executed within a cloud-based database system that accesses the database system of the enterprise; the deployer is provided within the database system of the enterprise; and the interoperable format comprises core schema notation (CSN).

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to enabling data provided in a first system to be accessed and processed by an analytics engine of a second system. More particularly, implementations of the present disclosure transform metadata (that is used by the first system to store and access data) from a first format to a second format through an intermediate format to enable the analytics engine of the second system to access the data for analytics processing.

Implementations can include actions of retrieving metadata associated with data stored within a database system of an enterprise, the metadata being provided in a first format and being used by the first system to store and access the data, providing a document including the metadata provided in an interoperable format, processing, by a deployer, the document to provide analytics engine metadata in a second format, the analytics metadata being stored in the second system and being consumable by the DB-based analytics engine to access the data from the database system of the enterprise, and retrieving, by the DB-based analytics engine, the data from the database system of the enterprise based on the analytics metadata to provide analytics data based on the data.

Implementations of the present disclosure are described in further detail herein with reference to products, services, and infrastructures provided by SAP SE of Walldorf, Germany. It is contemplated, however, that implementations of the present disclosure can be realized with any appropriate products, services, and/or infrastructures provided by one or more providers.

To provide further context for implementations of the present disclosure, and as introduced above, an enterprise can use multiple systems for storing and processing data. For example, an enterprise can use a system that stores data in a database system and provides metadata that defines how the data is stored and how the data is accessed. An example system includes, without limitation, a data warehouse (DW), which can be described as a system used for storing data, generating reports, and executing data analytics. A DW can be considered a central repository of data integrated from disparate sources and includes metadata that defines how the data is stored and how the data is accessed. For example, the data can be stored in a particular schema (e.g., star schema, discussed below). A DW can store a significant amount of data (e.g., multiple terabytes of data). In some scenarios, a DW is provided as an on-premise system, such that the DW is at least partially managed by the enterprise, for which the DW is established.

By way of non-limiting example, an example DW includes SAP Business Warehouse (BW) provided by SAP SE of Walldorf, Germany. SAP BW can be described as a model-driven data warehousing product based on the SAP NetWeaver ABAP platform. SAP BW collects, transforms and stores data generated in SAP and non-SAP applications and makes the data accessible through built-in reporting, business intelligence, and analytics tools. In SAP BW, data is accessed using so-called InfoCubes, each InfoCube being made up of a set of InfoObjects, which include characteristics (e.g., master data with their attributes and text descriptions) and key figures. An InfoObject can be described as a type of InfoProvider, which is a data object that is created and used to run queries. An InfoCube is structured using a star schema, which includes a fact table that contains key figures for the InfoCube, and several dimension tables surround the fact table. The fact table and dimension tables are both relational database tables that are stored in the underlying database system.

In some examples, a DW (such as SAP BW) includes an analytics engine that enables data to be retrieved from the underlying database system, executes analytics on the retrieved data, and provides analytics results to a client. For example, the analytics engine (also referred to herein as the DW analytics engine, or server-based analytics engine) is executed within an application server. In some examples, the application server receives a request from a client (e.g., a computing device in communication with the application server), and interprets the request based on metadata to determine which data to retrieve from the database. The application server queries the database system using a query language (e.g., (SQL)), and receives data (e.g., hundreds, thousands of records) responsive to the query from the database system. The application server processes the received data using the server-based analytics engine and provides analytics data to the client. This process can be referred to as a 3-tiered approach, in which the majority of processing is executed within the application server.

Analytics systems have been introduced that provide advanced analytics capabilities and improved data processing performance as compared to that provided by DWs, for example. Such analytics systems can include cloud-based analytics systems that include an analytics engine that is executed directly within the underlying database system (e.g., as opposed to a DW analytics engine that executes within an application server). Such an analytics engine is referred to herein as a database (DB) analytics engine (DB-based analytics engine). Accordingly, in response to a request from a client, the request is processed by the DB analytics engine within the database system. Consequently, data stored within the database system is directly accessed by the DB-based analytics engine for analytics processing within the database system, avoiding transmitting data from the database system for analytics processing (e.g., transmitting data from the database system to an application server).

By way of non-limiting example, an example cloud-based analytics system includes SAP Analytics Cloud (SAC) provided by SAP SE of Walldorf, Germany. SAC can be described as an all-in-one platform for business intelligence, planning, and predictive analytics to support enterprise operations. In some examples, SAP SAC uses multi-dimensional services (MDS), which provides a DB-based analytics engine. SAP SAC provides requests to the MDS in a particular protocol (e.g., information access (InA) protocol), which enables more complex data analytics requests to be formulated and executed (e.g., as compared to data analytics requests submitted through the DW).

To provide a unified user experience for enterprises using DWs, it is desirable to connect the DW to the DB-based analytics engine. In this manner, an enterprise using a DW is able to leverage the more sophisticated and resource-efficient analytics provided by an analytics system through the DB-based analytics engine. Traditional techniques to achieve this include, for example, providing a so-called live connection using an online analytical processing (OLAP) processor, and through the DB-based analytics engine using so-called calculation views created by the DW. However, such traditional techniques have disadvantages. For example, calculation views used in the database system access causes severe performance issues, because of the complexity and missing metadata.

With regard to complexity, view creation is designed for usage by SQL-based tools. Consequently, a calculation view contains many parts, which represent features of the DW that may be used. Often, the calculation view contains a complex calculation engine scenario with thousands of nodes. For example, available hierarchies are included by expensive (in terms of resources required to calculate) outer joins, currency conversions are built in, and the like. This leads to substantial instantiation, optimization and runtimes. DW, on the other hand, uses much simpler views—even using SIDs instead of values—and can access the data much faster.

With regard to missing metadata, many details of the view internals are not available as calculation view metadata, which must be used by the DB-based analytics engine. This leads to performance issues. For example, measures using the same currency or unit column or constant in the DW model are shown as different currency/unit columns in the view. The DB-based analytics engine cannot combine these in a single aggregation, because this may result in incorrect results. Runtimes increase with the number of measures used. As another example, all available hierarchies are included in the created view. Without the appropriate metadata, hierarchies requested in the analytics system cannot be used. As another example, the view may contain restricted key figures with additional filters. The calculation view metadata, however, contains a simple base measure only. Count aggregations, which do not explicitly request the measure, may return unexpected results, because the restricted key figure filter is not applied. Besides the above-disadvantages, traditional techniques for connecting the DW to the DB-based analytics engine suffer from other drawbacks.

In view of the above context, implementations of the present disclosure enable data provided in a first system to be accessed and processed by an analytics engine of a second system. More particularly, and as described in further detail herein, implementations of the present disclosure transform metadata (that is used by the first system to store and access data) from a first format to a second format through an intermediate format (referred to herein as an interoperable format) to enable the analytics engine of the second system to access the data for analytics processing.

Implementations of the present disclosure are described in further detail herein with reference to a DW system. It is contemplated, however, that implementations of the present disclosure can be realized with any appropriate system that stores data that is to be accessed by another system.

Figure 1:
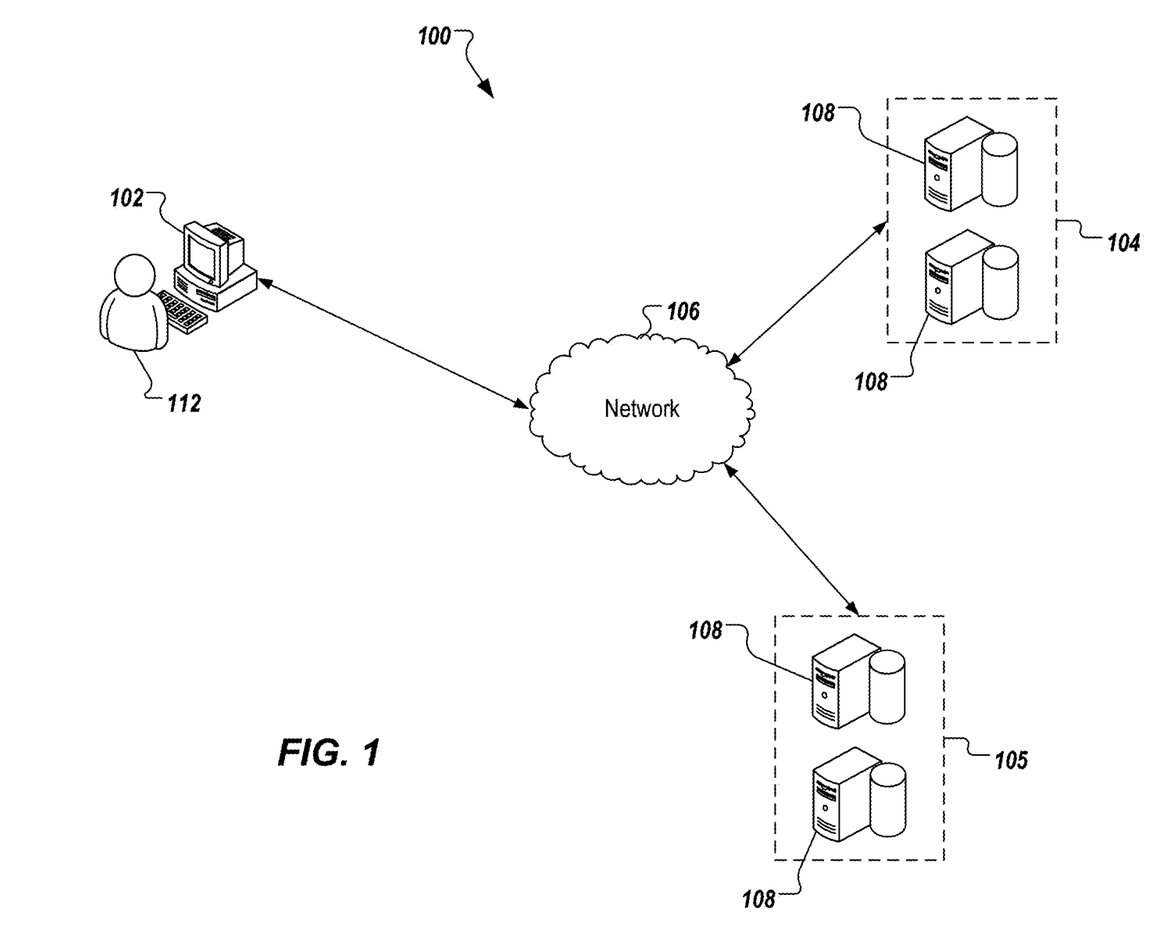
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and server systems 104, 105. The server systems 104, 105 each include one or more server devices and databases 108 (e.g., processors, memory). In the depicted example, a user 112 interacts with the client device 102.

In some examples, the client device 102 can communicate with the server systems 104, 105 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server systems 104, 105 each include at least one server and at least one data store. In the example of FIG. 1, the server systems 104, 105 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, the server system 104 can host a DW system operated for enterprise, and the server system 105 can be operated by a software provider (e.g., SAP SE) to provision services for one or more enterprises. In some examples, the server system 104 and/or the server system 105 hosts a database system, within which data of the enterprise is stored. An example database system includes, without limitation, SAP HANA provided by SAP SE of Walldorf, Germany. SAP HANA can be described as a data platform that processes transactions and analytics at the same time on any data type, with built-in advanced analytics and multi-model data processing engines. As described in further detail herein, implementations of the present disclosure enable data of the DW system to be accessed and processed for analytics using the cloud-based analytics system.

Figure 2:
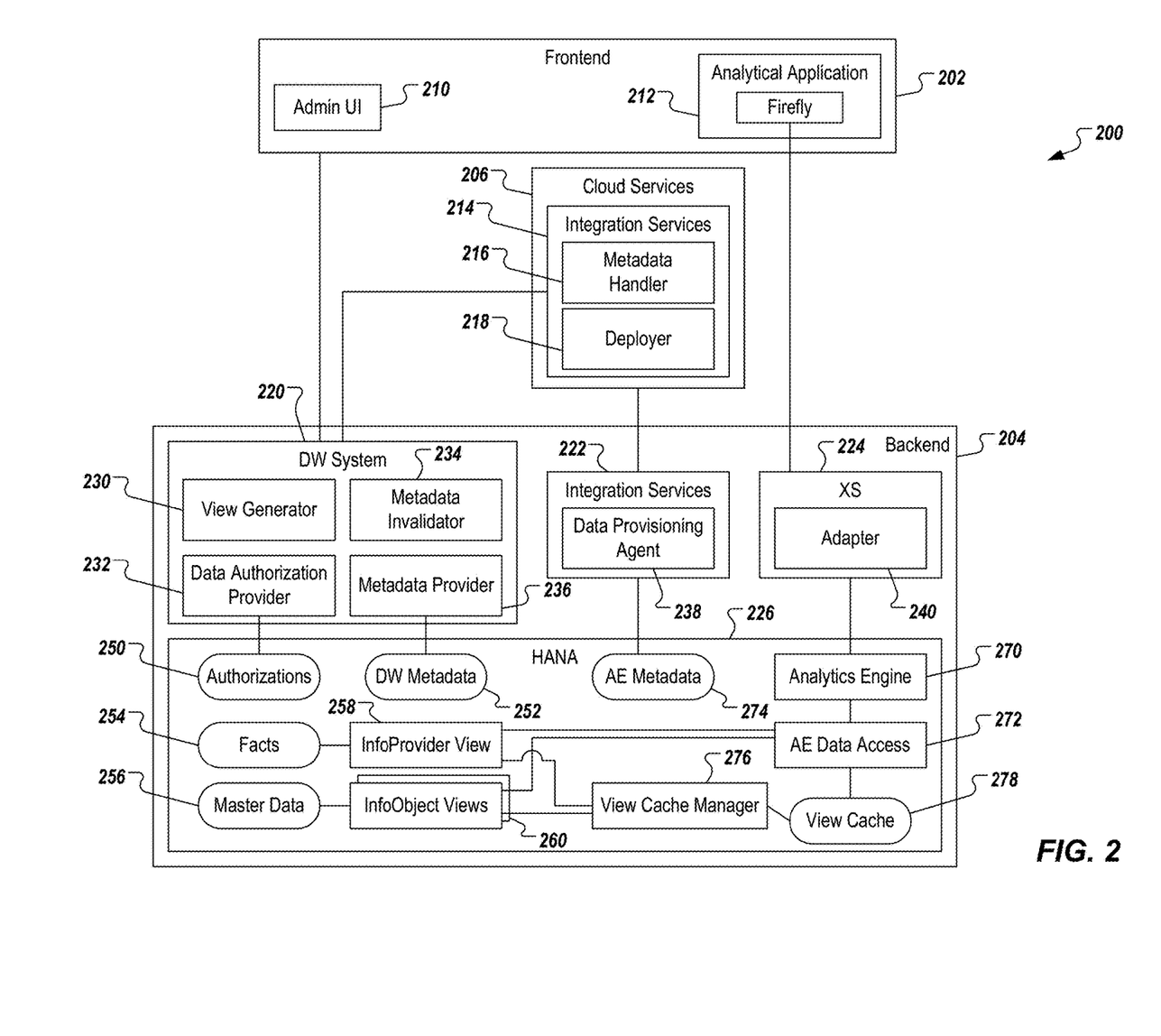
FIG. 2 depicts an example conceptual architecture in accordance with implementations of the present disclosure.

FIG. 2 depicts an example conceptual architecture 200 in accordance with implementations of the present disclosure. In the depicted example, the example conceptual architecture 200 includes a frontend system 202, a backend system 204, and a cloud services system 206. In general, the example conceptual architecture 200 depicts an on-premise approach, in which a system (e.g., a DW system), a database system, and a DB-based analytics engine are provisioned within a server system operated by an enterprise (e.g., the server system 104 of FIG. 1). That is, for example, the backend system 204 is a backend system of the enterprise. In some examples, the cloud services system 206 is provided by a software provider (e.g., SAP SE) on a server system (e.g., the server system 105 of FIG. 1).

In some examples, the frontend system 202 can be executed by one or more client-side devices (e.g., the client device 102 of FIG. 1) and includes a DW administrator user interface (UI) 210 and an analytics application 212 (e.g., provided as part of SAP SAC). The cloud services system 206 can be executed by one or more server-side devices (e.g., the server system 105 of FIG. 1). In accordance with implementations of the present disclosure, the cloud services system 206 includes integration services 214, which includes a metadata handler 216 and a deployer 218. Although the integration services 214 is depicted within the cloud service 206, it is contemplated that the integration services 214 can be provisioned directly within the backend 204. For example, in some implementations, the metadata handler 216 and the deployer 218 can be provisioned within the backend 204 (e.g., on-premise).

In the depicted example, the backend 204 includes a DW system 220, integration services 222, application services 224, and a database system 226. By way of non-limiting example, the DW system 220 can be provided as at least a portion of SAP BW, introduced above, and the application services 224 can be provided as SAP extended application services (XS) provided by SAP SE of Walldorf, Germany. Also by way of non-limiting example, the database system 226 can be provided as SAP HANA.

In the example of FIG. 2, the DW system 220 includes a view generator 230, a data authorization provider 232, a metadata invalidator 234, and a metadata provider 236. The integration services 222 includes a data provisioning agent 238, and the application services 224 includes a protocol adapter 240 (e.g., for the InA protocol). In some examples, the data provisioning agent 238 is provided to enable communication (e.g., using HTTP) between the cloud services 206 provided by the software provider and the backend system 204 of the enterprise provided as an on-premise system.

In the example of FIG. 2, the database system 226 includes an authorizations store 250, a DW metadata store 252, a facts store 254, a master data store 256, one or more InfoProvider views 258, and, for each InfoProvider view 258, one or more InfoObject views 260. The DW metadata store 252 stores metadata that describes how data is stored and can be accessed within the database system 226 (e.g., metadata that describes columns, views, and relationships therebetween).

The facts store 254 stores fact data, which can be described as data that changes relatively frequently. Example fact data includes, without limitation, sales, revenue, cost, net values, keys (e.g., a key identifying a specific customer) and the like. The master data store 256 stores master data, which can be described as data that changes less frequently (e.g., as compared to fact data). An example of master data includes, without limitation, customer data (e.g., name, address, telephone number).

The database system 226 further includes an analytics engine 270 (e.g., provide as MDS), an analytics engine data access component 272, analytics engine metadata 274, a view cache manager 276, and a view cache 278. In some examples, the view cache manager 276 monitors views (e.g., InfoProvider views 258, InfoObject views 260) generated within the database system 226, and caches views in the view cache 278. Accordingly, the first time a view is requested, the view can be generated and stored in the view cache 278, and the second time the view is requested, the view can be provisioned from the view cache 278, if still available in the view cache 278. In this manner, computing resources of the backend system 204 can be preserved, because the view does not need to be (re-)generated with each request.

As described in further detail herein, implementations of the present disclosure enable the DB-based analytics engine 270 direct access to data stored by the DW system 220 within the database system 226. That is, the DB-based analytics engine 270 is able to directly access facts stored in the fact store 254 and master data stored in the master data store 256. For example, the analytics engine 270 receives a request for analytics processing from the analytical application 212 and through the application services 224. The analytics engine 270 uses the analytics engine metadata 274 to provide a data access request to access one or more InfoProvider views 258 and one or more InfoObjects 260. In some examples, the data access request is received by the analytics engine data access component 272, which processes the data access request to retrieve data relevant to the request for analytics.

In accordance with implementations of the present disclosure, DW metadata stored in the DW metadata store 252 is transformed into analytics engine metadata that has a format that is consumable by the DB-based analytics engine 270 and that is stored in the analytics engine metadata store 274. In some implementations, the metadata provider 236 retrieves metadata from the DW metadata store 252 that would be needed to access a particular view. The metadata provider 236 transforms the metadata from a first format to an interoperable format. In some examples, the first format is specific to analytics processing of the DW system (e.g., by a server-based analytics engine executed on an application server), and the interoperable format is not bound to any analytics engine. The interoperable format includes the metadata and expresses the semantics and intent of the metadata. In some examples, the interoperable format includes core schema notation (CSN) and the metadata is provided within a metadata document (e.g., a Javascript object notation (JSON) document). A non-limiting example CSN representation is provided below in Listing 1. In the example of Listing 1, there are two references to "MAX_PLUS_MIN," one in a section "elements" and one in a section "query," which contain the design-time information in terms of standardized/interoperable "annotations", e.g. "@EndUserText.label", "@Aggregation.default."

In some implementations, the integration services 214 receives the metadata document from the DW system 220 (e.g., in response to an HTTP request issued by the integration services 214 to the DW system 220). The metadata handler 216 interprets the metadata document received from the DW system 220 and provides the metadata document to the deployer 218. In some examples, the metadata stored in the DW system 220 can be described as single entity definitions and their relations to other entities. One task of the metadata handler 216 is, starting with a single entity (e.g., the central entity of a star schema), to collect all metadata from the metadata provider, which is required for the deployer 218 to create the AE/runtime-optimized metadata. This would include, for example, all related dimension entities, (language-dependent) texts, and hierarchies for a compete star schema. In order to do so, the metadata handler has to have knowledge about the functional scope of the deployer. The deployer 218 transforms the metadata from the interoperable format to a second format that is specific to the analytics engine 270 to provide the analytics metadata. In some examples, the analytics metadata includes data definition language (DDL) statements (e.g., to create or delete objects within the database system 226) and/or data modification language (DML) statements (e.g., to insert, update or delete data within the database system 226). The analytics metadata is stored in the analytics metadata store 274 through the data provisioning agent 238. In this manner, DW metadata from the DW metadata store 252 is transformed to provide analytics engine data stored in the analytics engine metadata store 274, the analytics engine 270 being able to consume the analytics metadata to retrieve data (e.g., facts, master data) within the database system 226 for analytics processing within the database system 226.

A non-limiting example DW representation is provided below in Listing 2. In the example of Listing 2, there are two sub-sections "MAX_PLUS_MIN" one in a section of "DataSourceFields" referring to a deployed database runtime artefact (e.g., a SQL view) and another in a section "Measures" (analytics-specific metadata for the MDS runtime).

Figure 3:
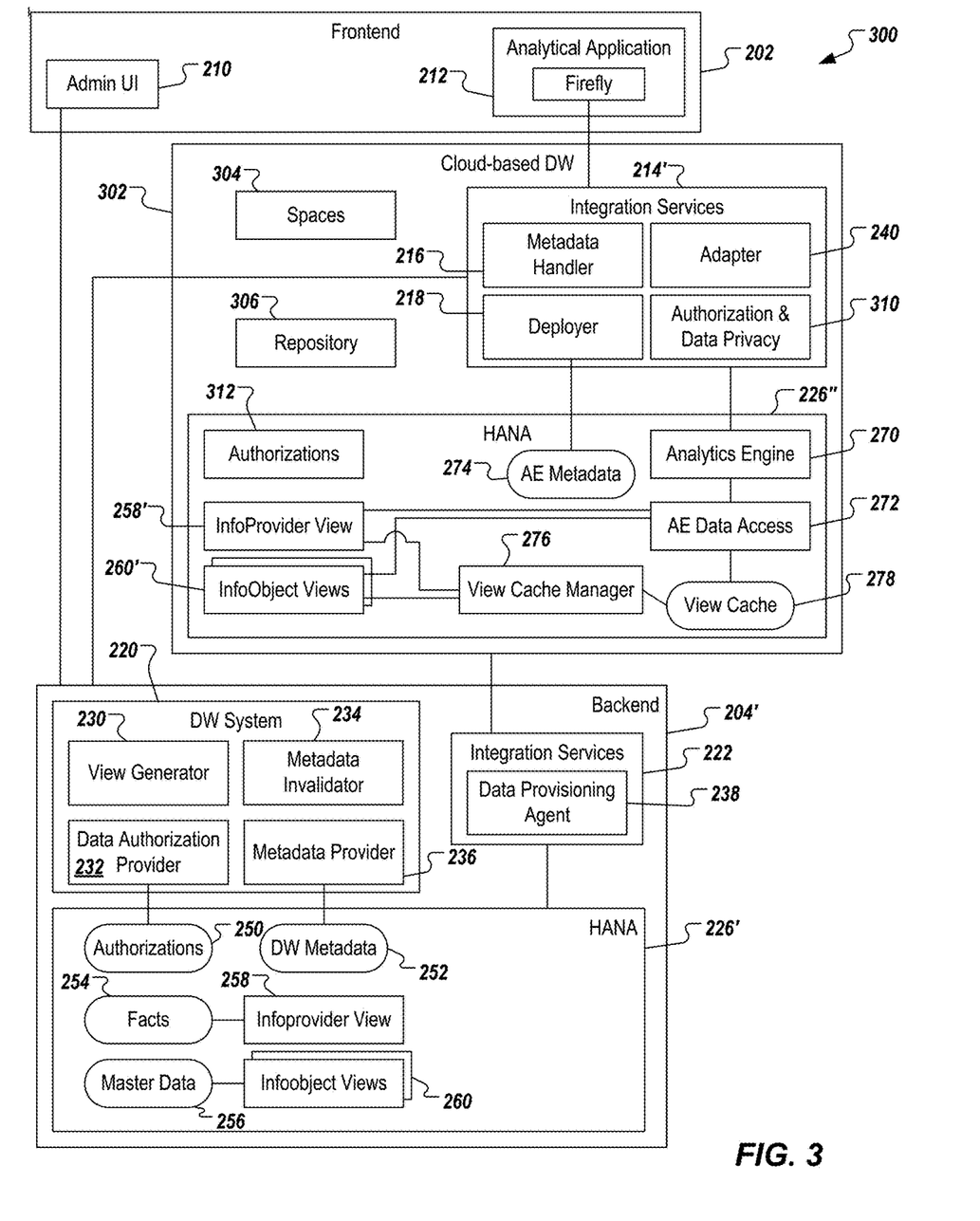
FIG. 3 depicts another example conceptual architecture in accordance with implementations of the present disclosure.

FIG. 3 depicts another example conceptual architecture 300 in accordance with implementations of the present disclosure. The example conceptual architecture 300 depicts a hybrid approach, in which an enterprise uses a cloud-based data warehouse system that access data stored in an on-premise system of the enterprise. In this manner, cloud-based functionality is provided, while maintaining the data on-premise. An example cloud-based data warehouse system includes, without limitation, the SAP Data Warehouse Cloud (DWC) provided by SAP SE of Walldorf, Germany.

In the example of FIG. 3, the example conceptual architecture 300 includes the frontend 202, a cloud-based DW (e.g., SAP DWC) 302, and a backend system 204' (i.e., on-premise system of the enterprise). The backend system 204' includes a DW system 220', the integration services 222, and a database system 226'. The DW system 220' includes the view generator 230, the data authorization provider 232, the metadata invalidator 234, and the metadata provider 236. The integration services 222 includes the provisioning agent 238. The database system 226' includes the authorizations store 250, the DW metadata store 252, the facts store 254, the master data store 256, the one or more InfoProvider views 258, and the one or more InfoObject views 260.

The cloud-based DW includes spaces 304, repositories 306, integration services 214', and a database system 226". The integration services 214' include the metadata handler 216, the deployer 218, the adapter 240, and an authorization and data privacy component 310. The database system 226" includes authorizations 312, provided as a remote table, one or more InfoProvider views 258', provided as respective remote tables, and one or more InfoObject view 260', provided as respective remote tables (also referred to as virtual tables). In some examples, a remote table is a technical artefact in the (local) database system, that appears in all usages to be a table, but in fact it points to a table or view in another database system, which can be referred to as a remote source. The database system 226" also includes the analytics engine 270, the analytics engine data access component 272, the analytics engine metadata 274, the view cache manager 276, and the view cache 278.

As similarly described above with reference to FIG. 2, DW metadata stored in the DW metadata store 252 is transformed into analytics engine metadata that has a format that is consumable by the DB-based analytics engine 270 and that is stored in the analytics engine metadata store 274. In some implementations, the metadata provider 236 retrieves metadata from the DW metadata store 252 that would be needed to access a particular view. The metadata provider 236 transforms the metadata from the first format to the interoperable format. In some implementations, the integration services 214' receives the metadata document from the DW system 220 (e.g., in response to an HTTP request issued by the integration services 214 to the DW system 220'). The metadata handler 216 interprets the metadata document received from the DW system 220' and provides the metadata document to the deployer 218. The deployer 218 transforms the metadata from the interoperable format to the second format that is specific to the analytics engine 270 to provide the analytics metadata, which is stored in the analytics metadata store 274. In this manner, DW metadata from the DW metadata store 252 is transformed to provide analytics engine metadata stored in the analytics engine metadata store 274, the analytics engine 270 being able to consume the analytics metadata to retrieve data (e.g., facts, master data) within the database system 226' for analytics processing within the database system 226".

In some implementations, to trigger transformation of metadata to provide analytics engine metadata, data within the database system 226, 226' can be identified as being accessible by the analytics engine 270. For example, a user (e.g., an administrator) can access the DW system 220, 220' through the DW administrator UI 210, and can mark data (e.g., InfoProviders) that are to be accessible to the analytics engine 270. For example, the user can set a flag associated with the data, the flag indicating that the data is to be accessible to the analytics engine 270. In some examples, for each InfoProvider marked as to be accessible to the analytics engine 270, a SQL view is generated with all dimensions relevant to the InfoProvider and including navigation attributes and measure fields from the InfoProvider. In some examples, only fields of the InfoProvider (e.g., dimension-key, measures) are included. In response to data being marked as accessible to the analytics engine 270, the metadata provider 236 can retrieve corresponding metadata from the DW metadata store 252 to transform the metadata and provide the analytics engine metadata, as described herein.

In some implementations, it can be determined that metadata underling data that is to be accessible to the analytics engine 270 has changed. For example, an update to the database system 226, 226' can result in a structure of data being changed, which also results in the corresponding metadata being changed. In some examples, the metadata invalidator 234 can be provided as a listener that detects a change in metadata of data that is to be accessible to the analytics engine 270. If a change has occurred, the metadata invalidator 234 triggers redeployment of the metadata as analytics engine metadata. That is, for example, the metadata provider 236 can retrieve corresponding metadata from the DW metadata store 252 to transform the metadata and provide the analytics engine metadata, as described herein.

For purposes of illustrating implementations of the present disclosure, and without limitation, a brief description and example of the analytics engine 270 processing a request from the analytical application is provided and includes how the analytics metadata is used to identify and access data (i.e., an end-to-end workflow starting from the analytics application making a request to the MDS). In further detail, the analytical application request metadata in order to, for example, offer the selection of dimensions and measures to a user (e.g., in an "edit chart" dialogue). In some examples, the MDS reads its private representation and converts the measures section into the format specified for client/server exchange for metadata (which is close to the MDS-internal format). This is part of the runtime optimization: that it only uses relatively few and cheap (in terms of resources expended to execute) transformations to prepare the response for a metadata request. The analytical application has a chart definition, for example, with the dimension "Fiscal Year" and the measure "Max+Min," and sends a corresponding data request to the MDS. The MDS reads the metadata of the requested fields in order to prepare a response to the data request. The MDS determines that "Fiscal Year" is a dimension and there is a corresponding column in the data source/underlying SQL view, and that "Min+Max" is a measure. In some examples, "Min+Max" can be provided as a formula (e.g., non-SQL default aggregation FORMULA), referring to other measures "Min" (with default aggregation MIN) and "Max" (with default aggregation MAX). For those measures there are corresponding columns in the data source.

In some examples, the MDS prepares an execution plan. An example execution plan based on the above example can include first reading MIN(Min) and MAX(max) group by FISCAL_YEAR from the underlying (SQL) data source, and then calculate the formula MAX_PLUS_MIN for each row of the result set. In some examples, the MDS executes the execution plan (e.g., by creating a complex SQL request or a transient DB runtime artefact ("calculation scenario") for this plan and execute it). The MDS returns the query result in accordance with the metadata (e.g. values for measure MIN_PLUS_MAX).

Figure 4A:
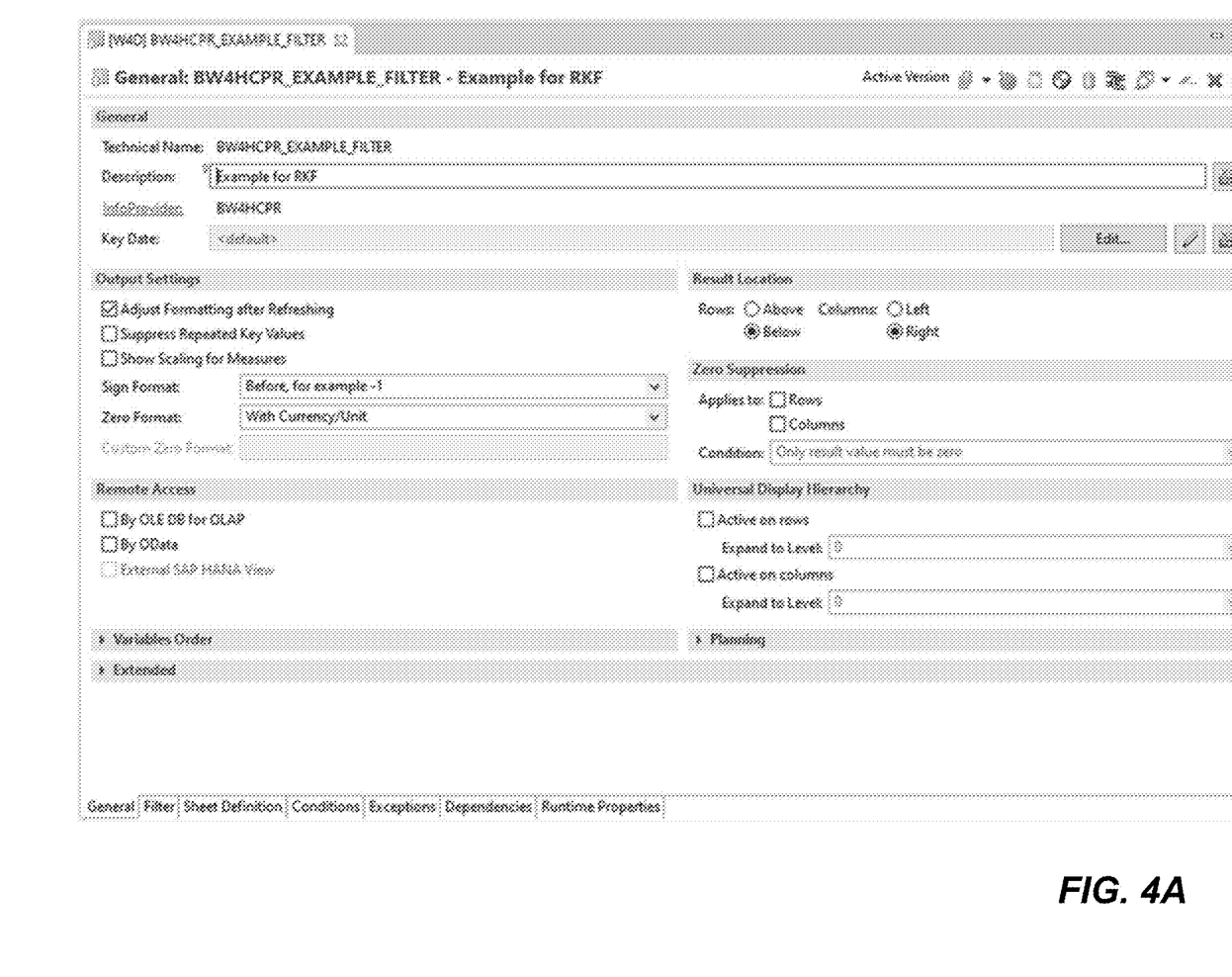
FIGS. 4A-4C depict example screen-shots for a query design-time within a data warehouse (DW) system.
Figure 4B:
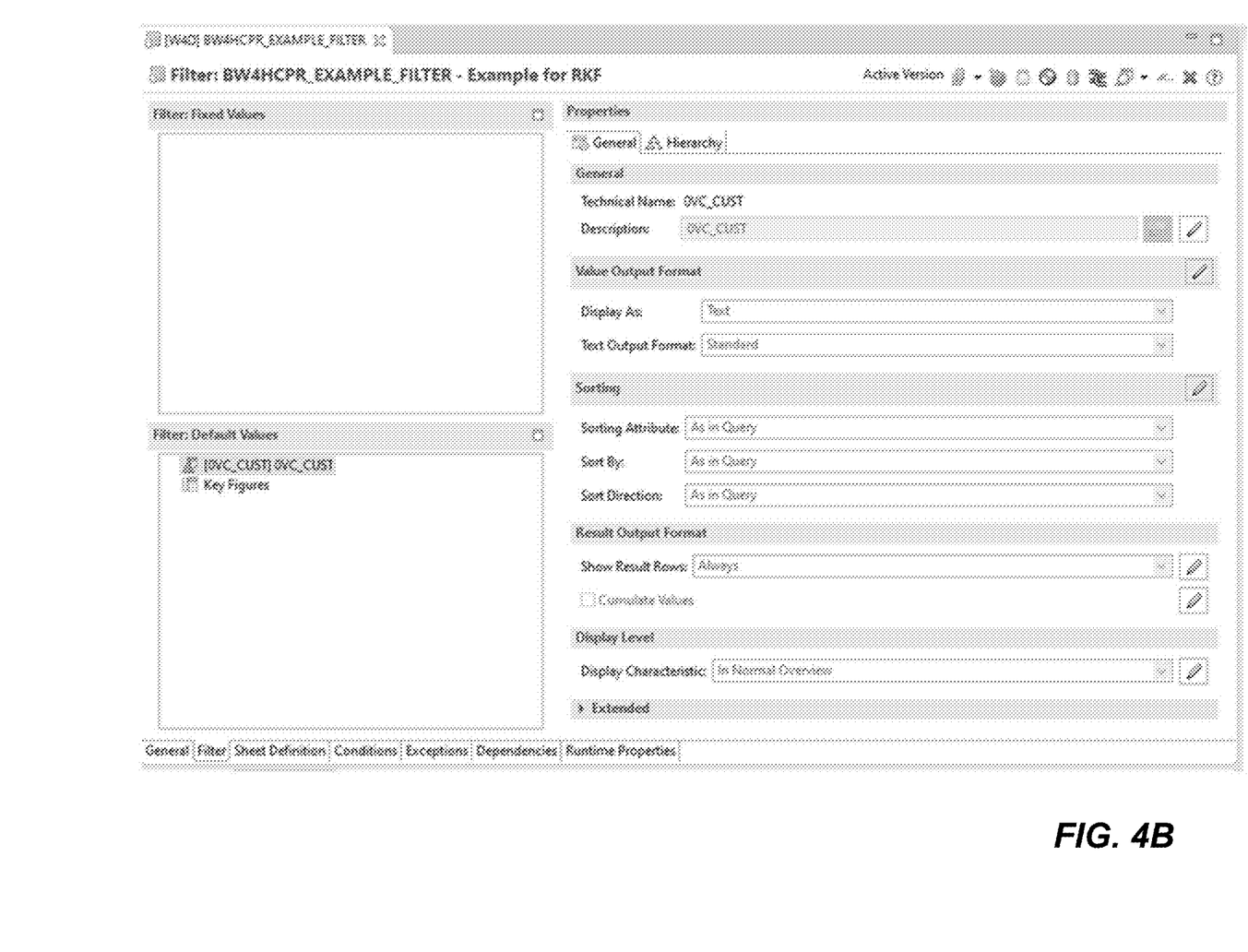
Figure 4C:
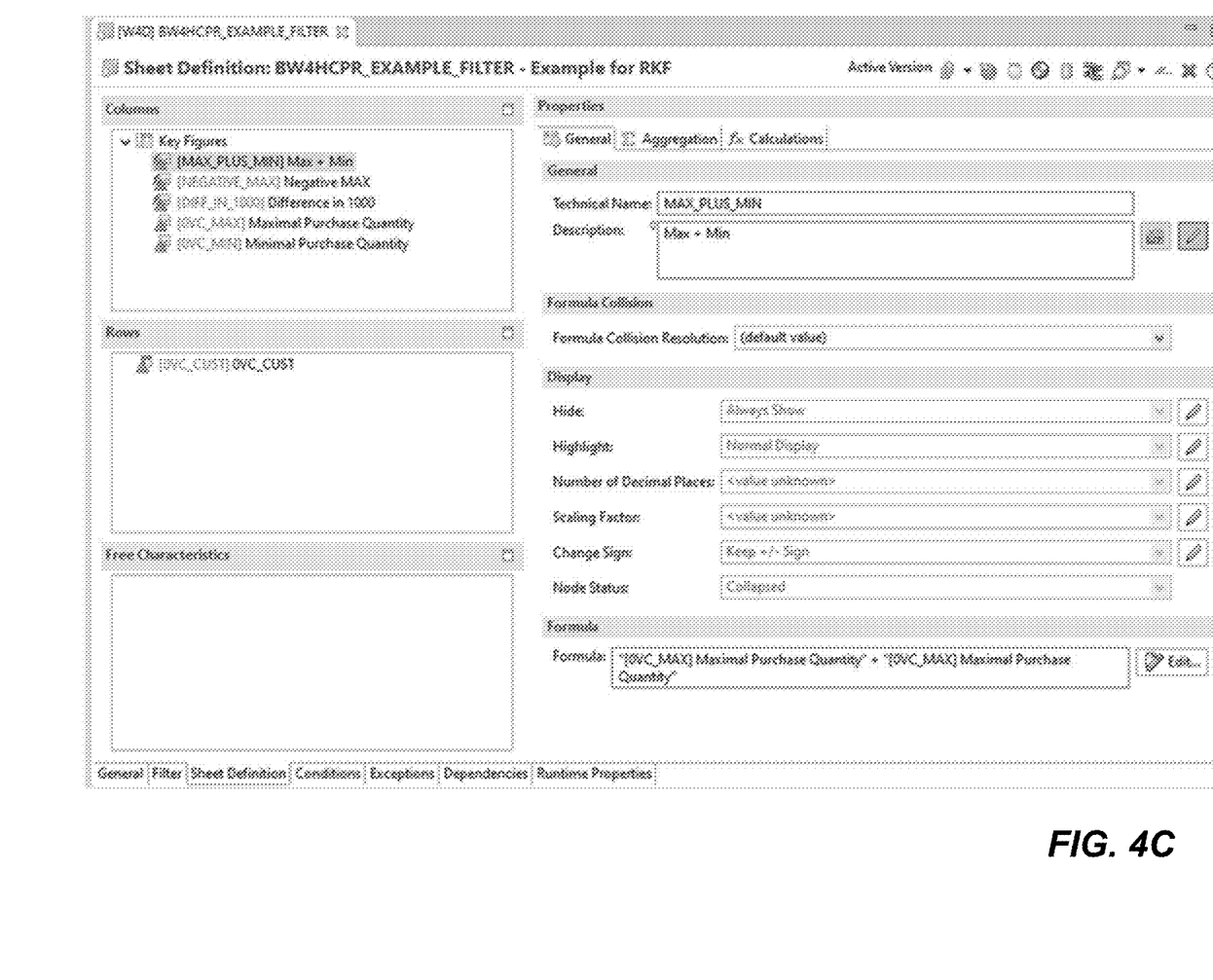

FIGS. 4A-4C depict example screen-shots for a query design-time within a DW system. In the examples of FIGS. 4A-4C, the example measure MAX_PLUS_MIN is defined, which is used in the examples of Listing 1 and Listing 2 provided herein.

Figure 5:
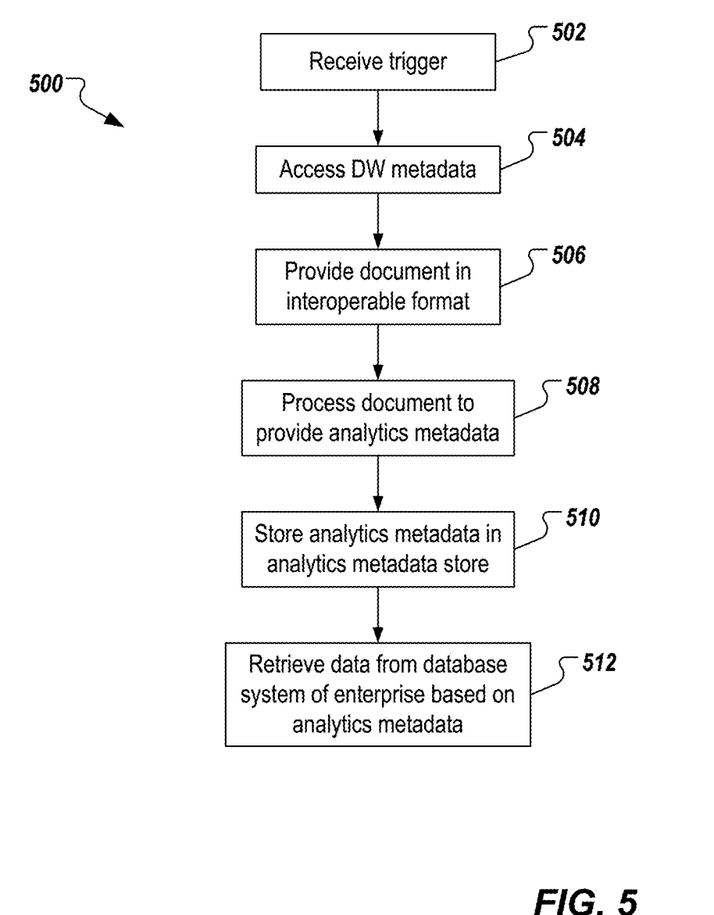
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices.

A trigger is received (502). For example, a user can mark data stored within the database system 226, 226' as to be accessible to the analytics engine 270, the trigger being marking of the data. As another example, it can be determined that metadata associated with data stored within the database system 226, 226' that is to be accessible to the analytics engine 270 has changed, the trigger being changing of the metadata. DW metadata is accessed (504) and a document is provided including DW metadata provided in the interoperable format (506). For example, in response to the trigger, DW metadata associated with the data that is to be accessible to the analytics engine 270 is accessed by the metadata provider 236, which converts the DW metadata to an interoperable format. In some examples, the interoperable format includes CSN.

The document is processed to provide analytics metadata (508). For example, the metadata handler 216 receives the document from the DW system 220, 220', and the deployer 218 processes the document to provide the analytics metadata in the second format, such that the analytics metadata is consumable by the analytics engine 270 to access the data from the database system 226, 226'. The analytics metadata is stored in the analytics metadata store (510). Data is retrieved from the database system of the enterprise based on analytics metadata (512).

Figure 6:
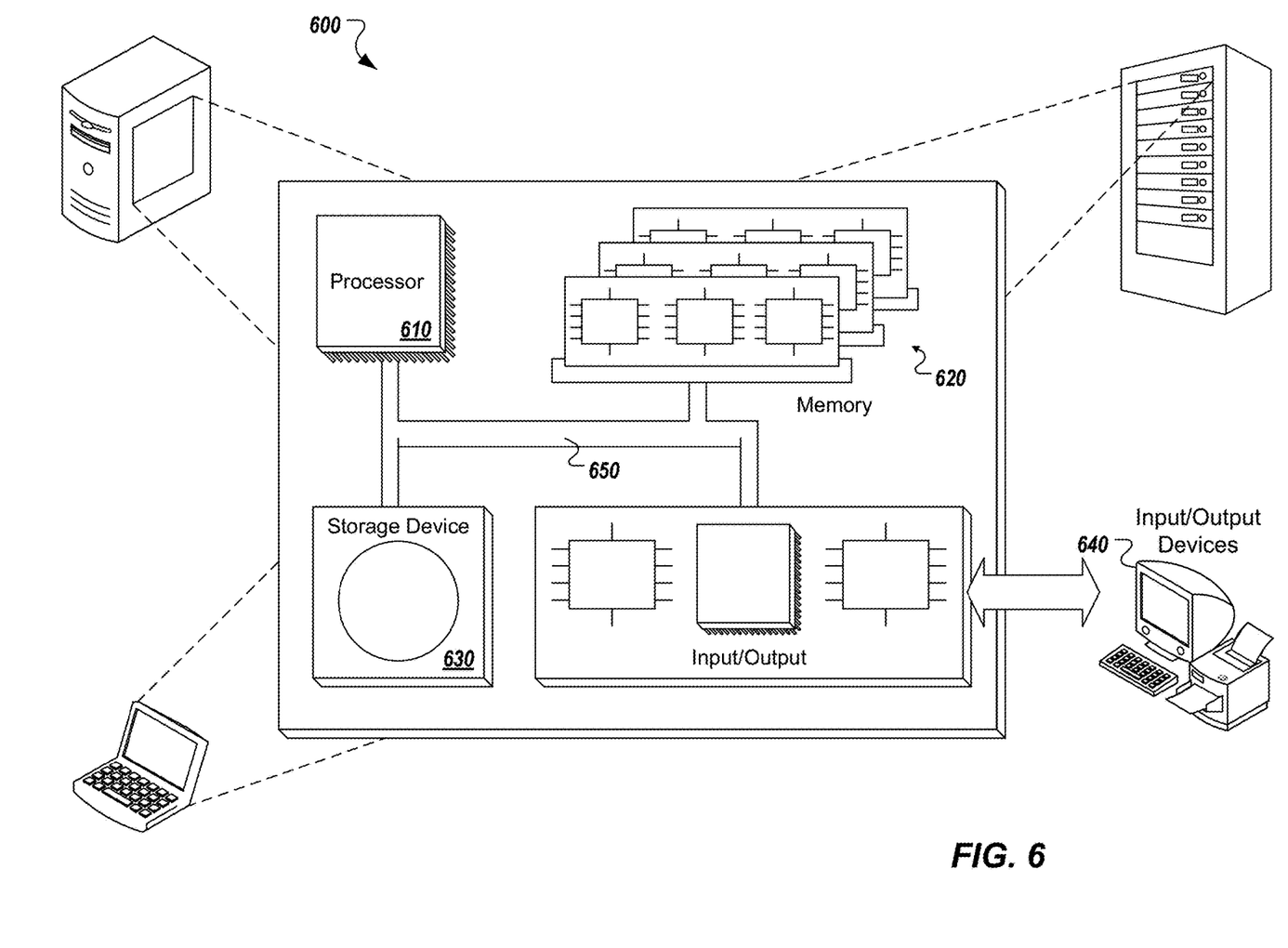
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a backend component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for accessing data provided in a first system by a database (DB)-based analytics engine of a second system, the method being executed by one or more processors and comprising:
retrieving data metadata associated with data stored within a database system of an enterprise, the data metadata being provided in a first format and being used by the first system to store and access the data, the data metadata describing how data is stored within the first system and comprising entity definitions and relationships between entities;
providing, by a metadata provider executed within the first system, a metadata document including the data metadata provided in an interoperable format transformed from the first format, the interoperable format being unbound to any analytics engine;
receiving, by integration services executed within a cloud service, the metadata document in response to a request issued by the integration services to the first system;
processing, by a deployer of the integration services, the metadata document to provide analytics metadata in a second format, the analytics metadata comprising one or more of data definition language (DDL) statements and data modification language (DML) statements, the analytics metadata being stored in the second system and being specific to the DB-based analytics engine to be consumable by the DB-based analytics engine to access the data from the database system of the enterprise; and
retrieving, by the DB-based analytics engine, the data from the database system of the enterprise based on the analytics metadata to provide analytics data based on the data.

2. The method of claim 1, wherein the data metadata is retrieved in response to the data being marked as to be accessible to the DB-based analytics engine.

3. The method of claim 1, wherein the data metadata is retrieved in response to determining that a change to the data metadata has occurred.

4. The method of claim 1, wherein the DB-based analytics engine is executed within the database system of the enterprise.

5. The method of claim 1, wherein the DB-based analytics engine is executed within a cloud-based database system that accesses the database system of the enterprise.

6. The method of claim 1, wherein the deployer is provided within the database system of the enterprise.

7. The method of claim 1, wherein the interoperable format comprises core schema notation (CSN).

8. A non-transitory computer-readable storage medium coupled to one or more processors and having instructions stored thereon which, when executed by the one or more processors, cause the one or more processors to perform operations for accessing data provided in a first system by a database (DB)-based analytics engine of a second system, the operations comprising:
retrieving data metadata associated with data stored within a database system of an enterprise, the data metadata being provided in a first format and being used by the first system to store and access the data, the data metadata describing how data is stored within the first system and comprising entity definitions and relationships between entities;
providing, by a metadata provider executed within the first system, a metadata document including the data metadata provided in an interoperable format transformed from the first format, the interoperable format being unbound to any analytics engine;
receiving, by integration services executed within a cloud service, the metadata document in response to a request issued by the integration services to the first system;
processing, by a deployer of the integration services, the metadata document to provide analytics metadata in a second format, the analytics metadata comprising one or more of data definition language (DDL) statements and data modification language (DML) statements, the analytics metadata being stored in the second system and being specific to the DB-based analytics engine to be consumable by the DB-based analytics engine to access the data from the database system of the enterprise; and
retrieving, by the DB-based analytics engine, the data from the database system of the enterprise based on the analytics metadata to provide analytics data based on the data.

9. The non-transitory computer-readable storage medium of claim 8, wherein the data metadata is retrieved in response to the data being marked as to be accessible to the DB-based analytics engine.

10. The non-transitory computer-readable storage medium of claim 8, wherein the data metadata is retrieved in response to determining that a change to the data metadata has occurred.

11. The non-transitory computer-readable storage medium of claim 8, wherein the DB-based analytics engine is executed within the database system of the enterprise.

12. The non-transitory computer-readable storage medium of claim 8, wherein the DB-based analytics engine is executed within a cloud-based database system that accesses the database system of the enterprise.

13. The non-transitory computer-readable storage medium of claim 8, wherein the deployer is provided within the database system of the enterprise.

14. The non-transitory computer-readable storage medium of claim 8, wherein the interoperable format comprises core schema notation (CSN).

15. A system, comprising:
a computing device; and
a non-transitory computer-readable storage device coupled to the computing device and having instructions stored thereon which, when executed by the computing device, cause the computing device to perform operations for accessing data provided in a first system by a database (DB)-based analytics engine of a second system, the operations comprising:
retrieving data metadata associated with data stored within a database system of an enterprise, the data metadata being provided in a first format and being used by the first system to store and access the data, the data metadata describing how data is stored within the first system and comprising entity definitions and relationships between entities;
providing, by a metadata provider executed within the first system, a metadata document including the data metadata provided in an interoperable format transformed from the first format, the interoperable format being unbound to any analytics engine;
receiving, by integration services executed within a cloud service, the metadata document in response to a request issued by the integration services to the first system;
processing, by a deployer of the integration services, the metadata document to provide analytics metadata in a second format, the analytics metadata comprising one or more of data definition language (DDL) statements and data modification language (DML) statements, the analytics metadata being stored in the second system and being specific to the DB-based analytics engine to be consumable by the DB-based analytics engine to access the data from the database system of the enterprise; and retrieving, by the DB-based analytics engine, the data from the database system of the enterprise based on the analytics metadata to provide analytics data based on the data.

16. The system of claim 15, wherein the data metadata is retrieved in response to the data being marked as to be accessible to the DB-based analytics engine.

17. The system of claim 15, wherein the data metadata is retrieved in response to determining that a change to the data metadata has occurred.

18. The system of claim 15, wherein the DB-based analytics engine is executed within the database system of the enterprise.

19. The system of claim 15, wherein the DB-based analytics engine is executed within a cloud-based database system that accesses the database system of the enterprise.

20. The system of claim 15, wherein the deployer is provided within the database system of the enterprise.

* * * * *